United States Patent
Nunami et al.

(10) Patent No.: US 10,628,588 B2
(45) Date of Patent: Apr. 21, 2020

(54) INFORMATION PROCESSING APPARATUS AND COMPUTER READABLE STORAGE MEDIUM

(71) Applicant: Toshiba Client Solutions CO., LTD., Koto-ku, Tokyo (JP)

(72) Inventors: Tsukasa Nunami, Kunitachi Tokyo (JP); Kouetsu Wada, Nishitama Tokyo (JP); Kohei Momosaki, Mitaka Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 143 days.

(21) Appl. No.: 15/885,579

(22) Filed: Jan. 31, 2018

(65) Prior Publication Data

US 2018/0314832 A1 Nov. 1, 2018

(30) Foreign Application Priority Data

May 1, 2017 (JP) .................. 2017-091308

(51) Int. Cl.
*G06F 1/24* (2006.01)
*G06F 21/57* (2013.01)
*G06F 9/4401* (2018.01)
*G06F 9/455* (2018.01)
*H04L 29/08* (2006.01)

(52) U.S. Cl.
CPC ............ *G06F 21/575* (2013.01); *G06F 9/441* (2013.01); *G06F 9/4406* (2013.01); *G06F 9/4416* (2013.01); *G06F 9/45533* (2013.01); *G06F 21/572* (2013.01); *G06F 9/4401* (2013.01); *H04L 67/10* (2013.01)

(58) Field of Classification Search
CPC ...... G06F 21/575; G06F 9/441; G06F 21/572; G06F 9/45533; G06F 9/4416; G06F 9/4406; H04L 67/10
USPC ............................................................. 713/2
See application file for complete search history.

(56) References Cited

U.S. PATENT DOCUMENTS

| 6,151,674 | A | 11/2000 | Takatani |
| 7,844,810 | B2 | 11/2010 | Takahashi |
| 9,055,128 | B2 | 6/2015 | Iwaya et al. |

(Continued)

FOREIGN PATENT DOCUMENTS

| JP | 11-249900 | 9/1999 |
| JP | 2005-316809 | 11/2005 |

(Continued)

*Primary Examiner* — Volvick Derose
(74) *Attorney, Agent, or Firm* — Knobbe, Martens, Olson & Bear, LLP

(57) ABSTRACT

According to one embodiment, an information processing apparatus includes a processor, a volatile memory, a BIOS-ROM, and an interface. An embedded OS in the BIOS-ROM causes the processor to execute connecting the apparatus to a server via a network, and when the server sets a first OS as an OS in the apparatus by switching from the embedded OS, and a nonvolatile memory connected via the interface stores a second OS used at previous startup of the apparatus, loading the second OS into the volatile memory and starting the second OS. The second OS causes the processor to execute downloading the first OS from the server and storing the downloaded first OS in the nonvolatile memory.

6 Claims, 7 Drawing Sheets

(56) References Cited

U.S. PATENT DOCUMENTS

| | | | |
|---|---|---|---|
| 2002/0004849 A1* | 1/2002 | Eigen | H04L 41/082 719/310 |
| 2002/0138592 A1* | 9/2002 | Toft | H04N 21/8173 709/219 |
| 2003/0014476 A1* | 1/2003 | Peterson | G06F 9/4416 709/203 |
| 2003/0070110 A1* | 4/2003 | Aija | G06F 11/1417 714/4.3 |
| 2003/0163680 A1* | 8/2003 | Wang | G06F 9/4416 713/1 |
| 2004/0143752 A1* | 7/2004 | Kumar | H04N 21/4431 726/34 |
| 2005/0235278 A1* | 10/2005 | Wu | G06F 8/60 717/168 |
| 2005/0246518 A1* | 11/2005 | Takahashi | G06F 9/4416 713/2 |
| 2006/0242395 A1* | 10/2006 | Fausak | G06F 9/4416 713/1 |
| 2008/0168310 A1* | 7/2008 | Saretto | G06F 11/2284 714/30 |
| 2010/0106826 A1* | 4/2010 | Sugawara | G06F 9/4416 709/224 |
| 2011/0138163 A1* | 6/2011 | Suginaka | G06F 9/4408 713/2 |
| 2012/0260123 A1* | 10/2012 | Madampath | G06F 9/545 714/4.1 |
| 2013/0007433 A1* | 1/2013 | Karandikar | G06F 21/575 713/2 |
| 2013/0104121 A1 | 4/2013 | Iwaya et al. | |
| 2014/0173268 A1* | 6/2014 | Hashimoto | G06F 11/0754 713/2 |
| 2015/0379308 A1* | 12/2015 | Nakano | G06F 21/50 726/36 |
| 2017/0249133 A1* | 8/2017 | Herzi | G06F 8/63 |

FOREIGN PATENT DOCUMENTS

| | | |
|---|---|---|
| JP | 2009-258922 | 11/2009 |
| JP | 2012-3329 | 1/2012 |
| JP | 2016-9370 | 1/2016 |

* cited by examiner

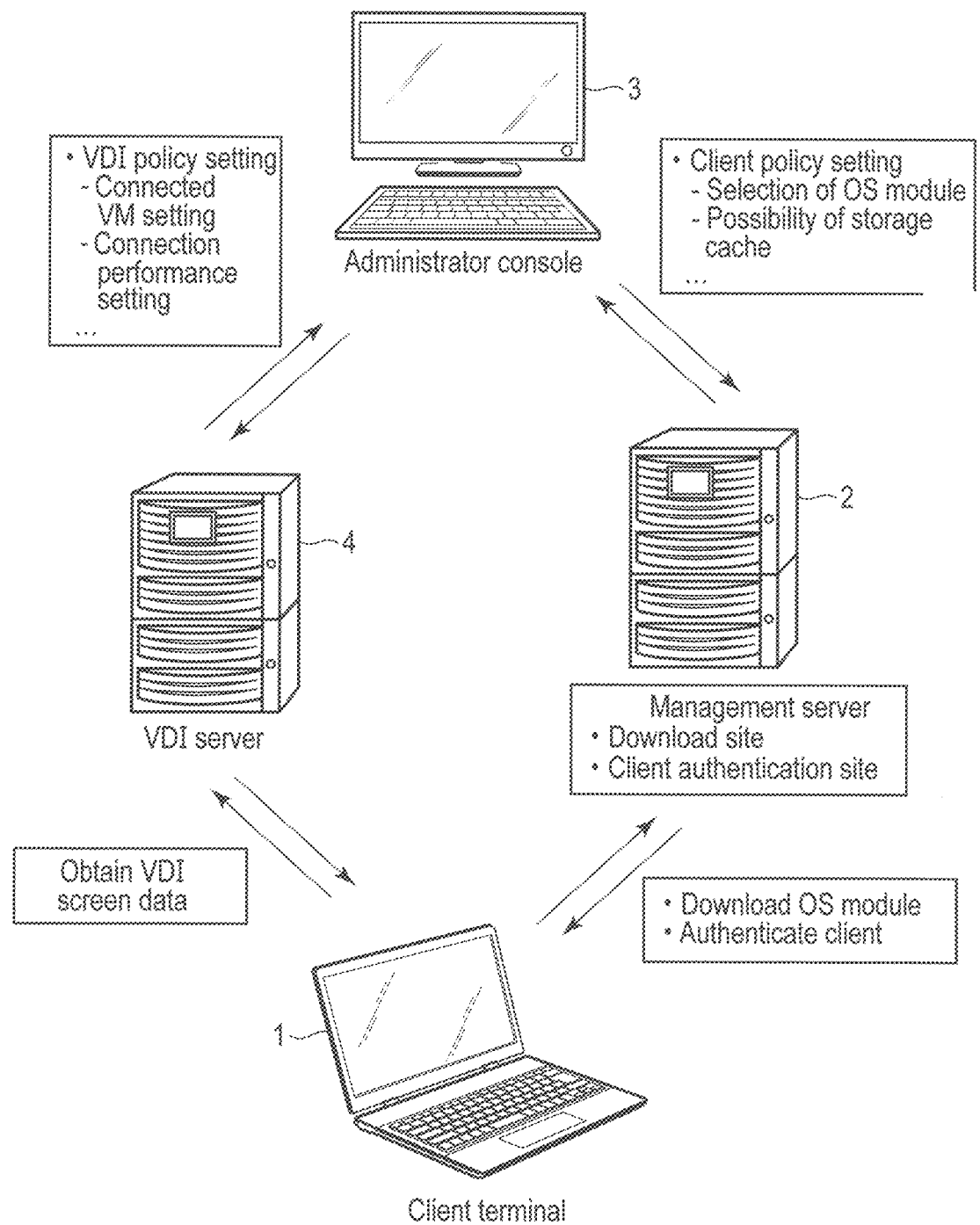
F I G. 1

| Policy name: | Policy | 81 | | 82 |

```
Policy name:          Policy                              81
┌ Authentication server ─────────────────────────────┐ 82
│ Server URL1:        http://xxx.xxx.xxx.xxx/OS/yyy   │
│ Server URL2:                                        │
└─────────────────────────────────────────────────────┘

┌ OS module ─────────────────────────────────────────┐
│ Application OS module:  OS-AA00BB-00.zip           │ 83
│ ☑ Permit save in terminal                          │
│ ☐ Permit download in background                    │
└─────────────────────────────────────────────────────┘
 830 — Application OS module
 831 — Permit save in terminal
 832 — Permit download in background ┌ VDI server ────────────────────────────────────────┐
│ VDI server URL:     https://vdsite0000.com/Vdi/Website/ │ 84
└─────────────────────────────────────────────────────┘

┌ Communication setting ─────────────────────────────┐
│ Number of retries:              X times            │
│ Retry interval of wired LAN:    XX seconds         │ 85
│ Retry interval of wireless LAN: XX seconds         │
│ Polling interval:               XX seconds         │
│ Action at time of disconnection: Shutdown          │
│ Number of computers:            X                  │
└─────────────────────────────────────────────────────┘

┌ Download server ───────────────────────────────────┐
│ Server URL1:        http://xxx.xxx.xxx.xxx/OS/ZZZ  │ 86
│ Server URL2:                                        │
└─────────────────────────────────────────────────────┘
```

F I G. 2

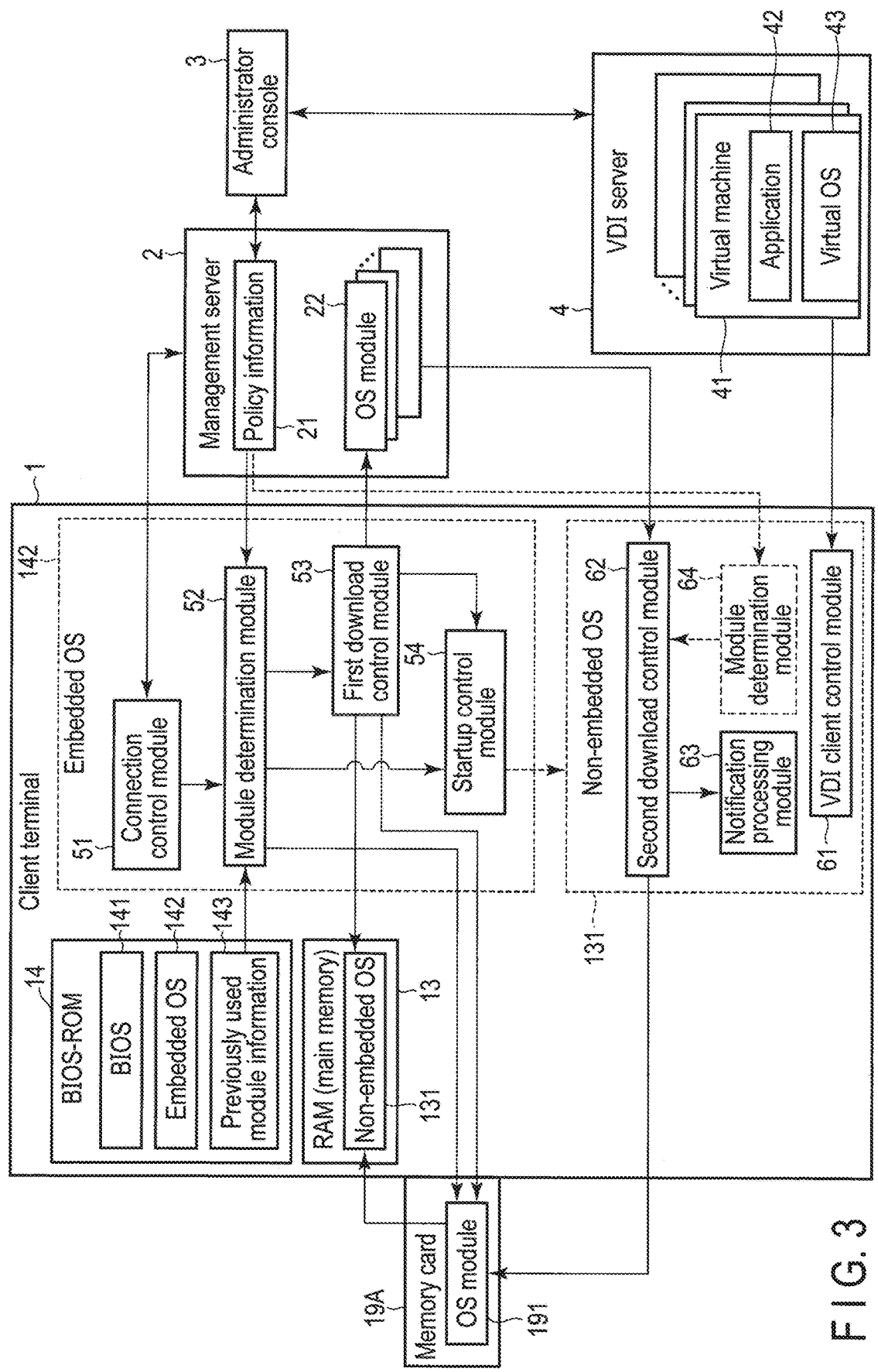
F I G. 3

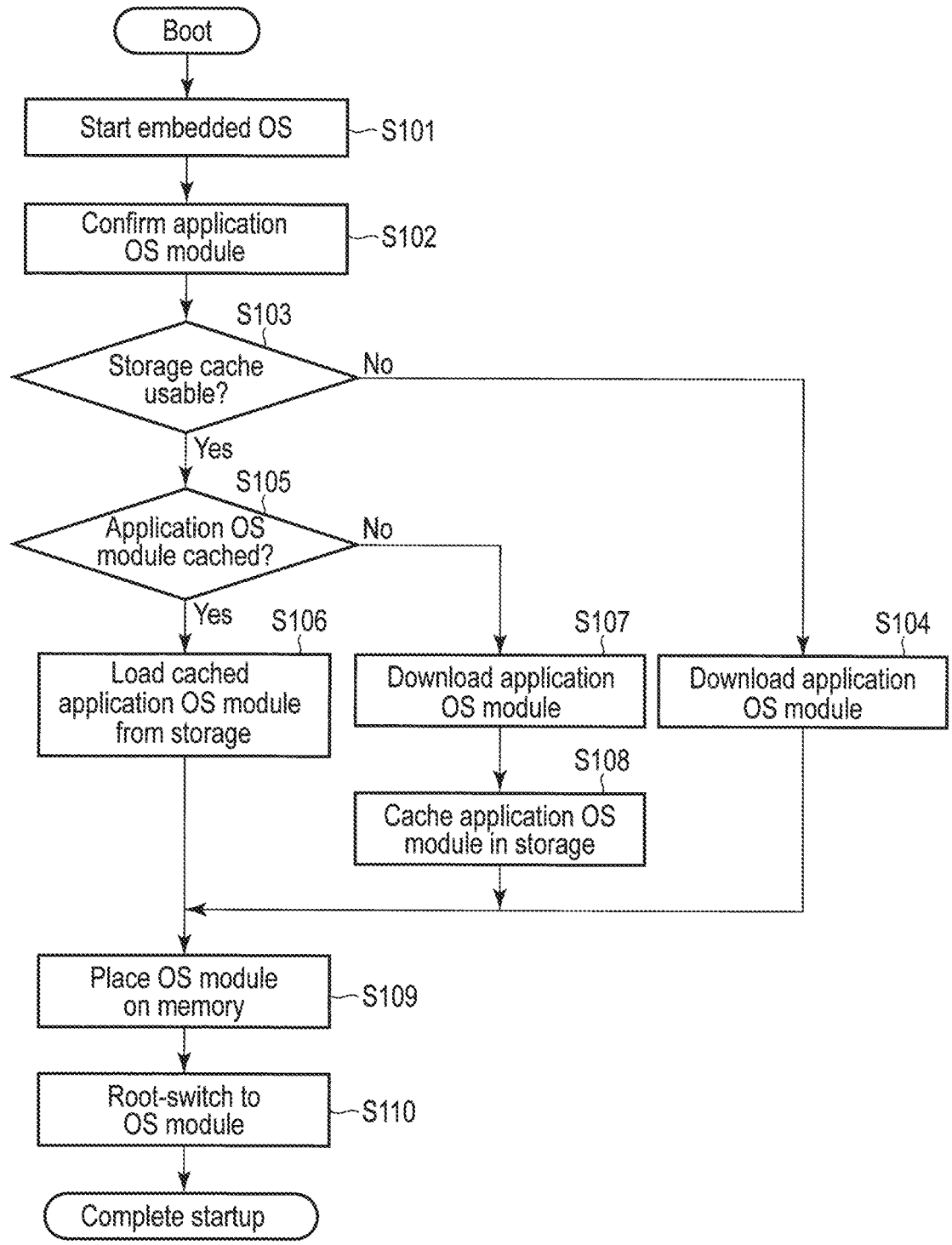
F I G. 4

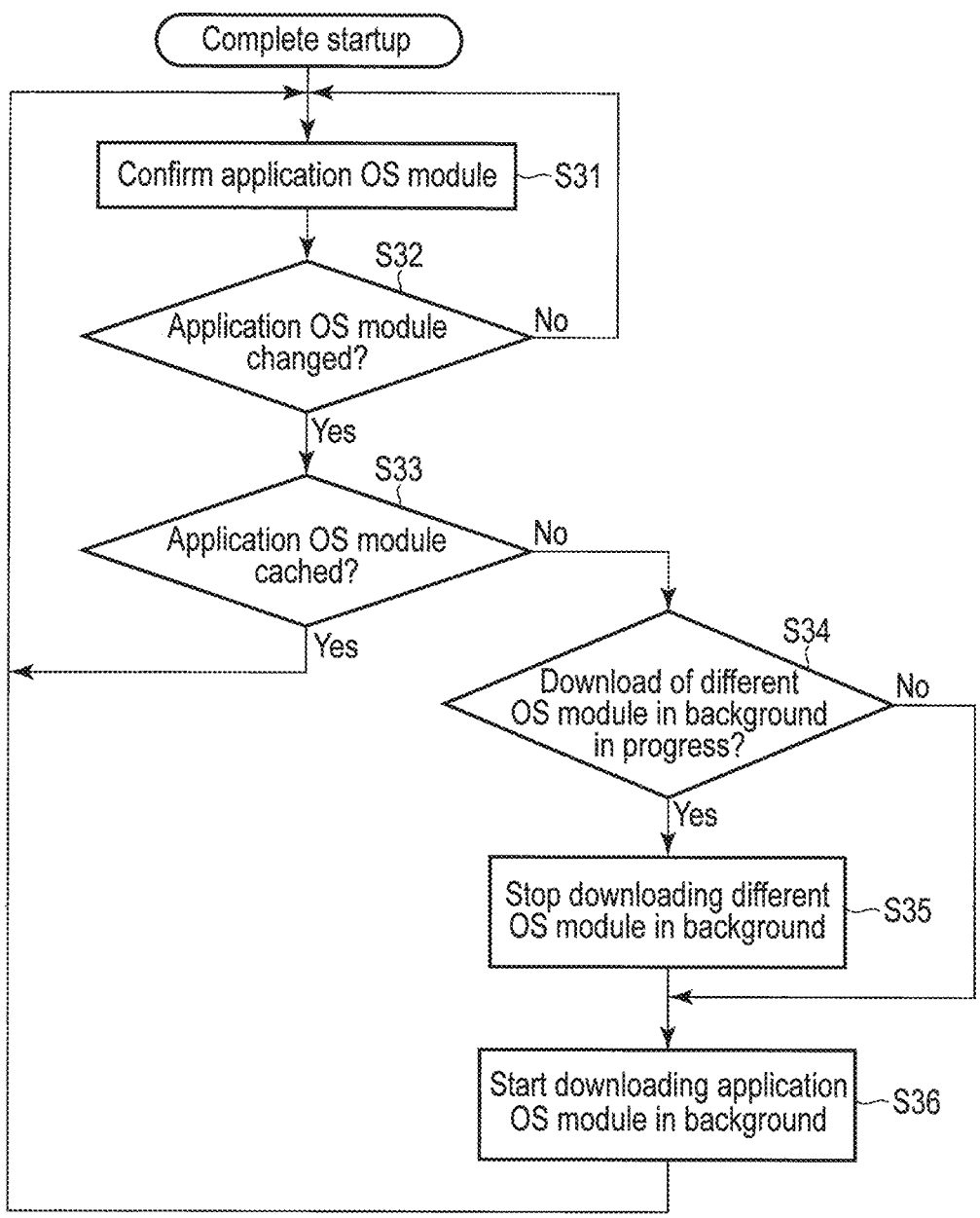
F I G. 6

INFORMATION PROCESSING APPARATUS AND COMPUTER READABLE STORAGE MEDIUM

CROSS-REFERENCE TO RELATED APPLICATIONS

This application is based upon and claims the benefit of priority from Japanese Patent Application No. 2017-091308, filed May 1, 2017, the entire contents of which are incorporated herein by reference.

FIELD

Embodiments described herein relate generally to a technology for desktop virtualization.

BACKGROUND

In recent years, information has been frequently leaked by losses or thefts of personal computers (i.e. client terminals). Thus, companies carrying out business, such as infrastructure business or medical business, are required to strictly manage their confidential information. So they are introducing such client terminals communicating with a server that can provide virtual desktop environment.

For example, a client terminal holds a basic input/output system (BIOS) and an operating system (OS) as minimum requirements. When booting up them, the client terminal is able to communicate with a server via a network and a client software for realizing virtual desktop environment on the client terminal is downloaded from the server.

Thus, as the client software is downloaded to the client terminal from the server during startup, the startup time tends to become long until the time when the user can use the virtual desktop environment.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 shows an exemplary view for explaining a system including an information processing apparatus (client terminal) according to one embodiment.

FIG. 2 shows an example of a policy-setting screen displayed on an administrator console in the system of FIG. 1.

FIG. 3 is an exemplary block diagram showing a functional configuration of the information processing apparatus of the embodiment.

FIG. 4 is a flowchart showing an example of the procedure of a startup control process executed by an information processing apparatus.

FIG. 6 is a flowchart showing an example of the procedure of a download update process executed by the information processing apparatus of the embodiment.

DETAILED DESCRIPTION

Figure 5:
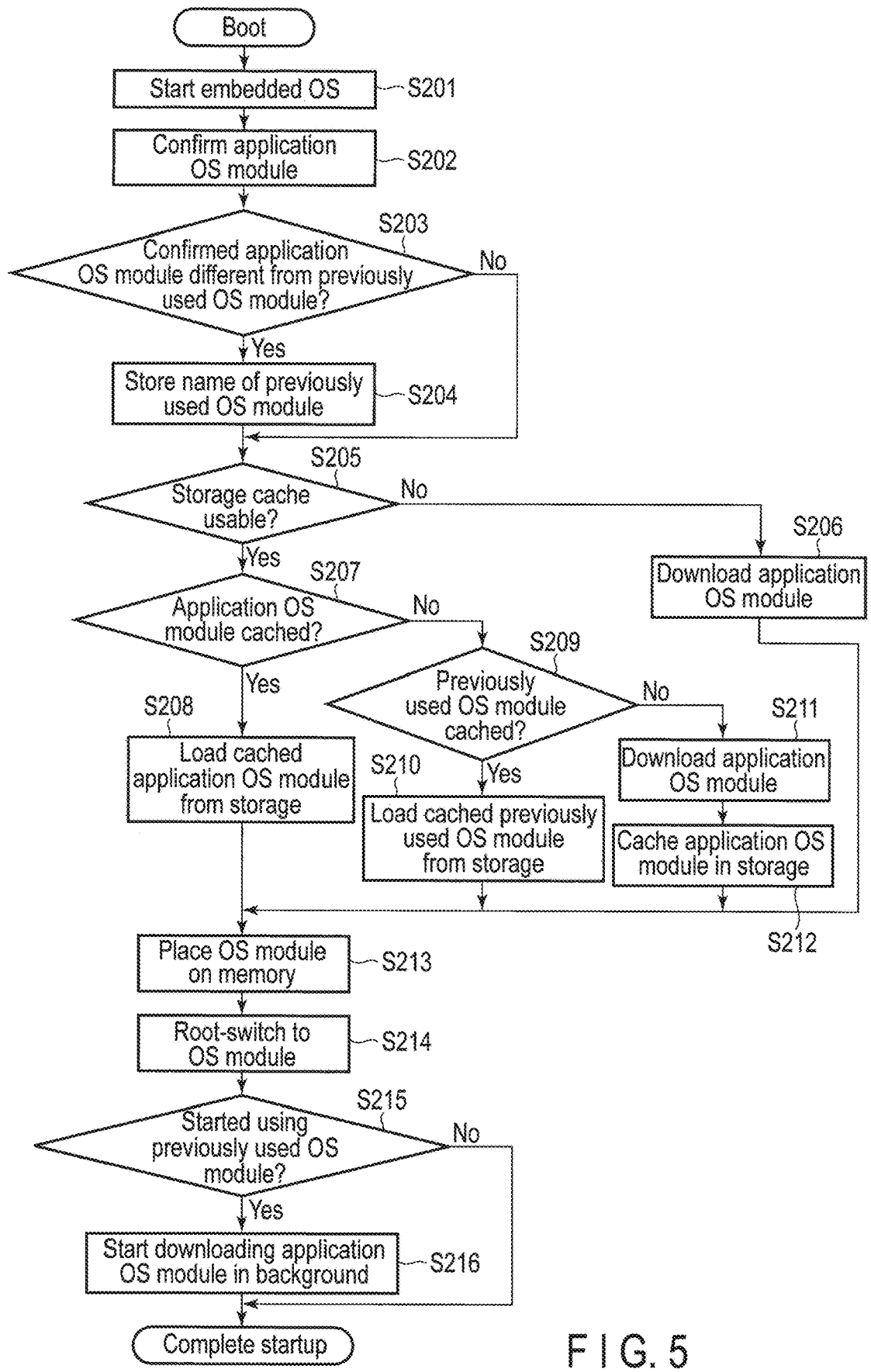
FIG. 5 is a flowchart showing an example of the procedure of a startup control process executed by the information processing apparatus of the embodiment.

Various embodiments will be described hereinafter with reference to the accompanying drawings.

In general, according to one embodiment, an information processing apparatus includes a processor, a volatile memory, a BIOS-ROM, and an interface. The BIOS-ROM is configured to store a basic input/output system (BIOS) and an embedded operating system. A removable and nonvolatile memory is connectable to the interface. The embedded operating system is configured to cause the processor to execute: connecting the information processing apparatus to a server via a network; and when the server sets a first operating system as an operating system in the information processing apparatus by switching from the embedded operating system, and the nonvolatile memory connected via the interface stores a second operating system used at previous startup of the information processing apparatus, loading the second operating system into the volatile memory and starting the second operating system. The second operating system is configured to cause the processor to execute: downloading the first operating system from the server; and storing the downloaded first operating system in the nonvolatile memory.

With reference to FIG. 1, this specification explains a system including an information processing apparatus according to one embodiment. The information processing apparatus functions as a client terminal for communicating with a server configured to provide virtual desktop environment. The information processing apparatus may be a clamshell type apparatus similar to a notebook computer or a slate type apparatus similar to a tablet computer. In the following description, this specification exemplifies a case where a notebook client terminal 1 realizes the information processing apparatus.

The client terminal 1 can communicate with a management server 2 via a network such as a wireless LAN or wired LAN. The client terminal 1 can also communicate with, via a network, a VDI server 4 configured to provide multiple client terminals including the client terminal 1 with virtual desktop environment.

The management server 2 has a function for confirming whether each client terminal is an authorized client terminal, and providing each client terminal 1 confirmed as an authorized client terminal with a program and information necessary for communication with the VDI server 4. Thus, the management server 2 functions as a client authentication site and a download site.

The VDI server 4 can use some types of technologies to realize desktop virtualization for providing virtual desktop environment. One of the technologies is virtual desktop infrastructure (VDI).

In the present embodiment, the system may use VDI as a technology to realize desktop virtualization. In this case, the VDI server 4 functions as a server configured to provide virtual desktop environment using VDI. The client terminal 1 functions as a VDI client terminal. The VDI server 4 transmits the image data (VDI screen data) of a screen and image data corresponding to the update portion of the screen to the client terminal 1 to provide virtual desktop environment. When the client terminal 1 displays a screen based on the image data, a user of the client terminal 1 can use desktop environment that is generated by a virtual machine executed on the VDI server 4 as if it is desktop environment generated by the operation of the client terminal 1.

An administrator console 3 may set a client policy used by the management server 2 and a VDI policy used by the VDI server 4. The management server 2 has a function for providing the administrator console 3 with a web-based graphical user interface (GUI) for changing and applying the setting of the client policy. The client policy includes information indicating the OS module to be applied to a client terminal 1 (hereinafter, referred to as an application OS module), information indicating the possibility of a storage cache of the application OS module by the client terminal 1, etc. The OS module may be the OS itself or a file (or files) in which the OS is compressed. The OS is, for example, an OS based on Linux (registered trademark).

The VDI server 4 has a function for providing the administrator console 3 with a web-based GUI for changing and applying the setting of the VDI policy. The VDI policy includes information related to the setting of the connected virtual machine (VM), information related to the setting of connection performance, etc.

FIG. 2 shows an example of a policy setting screen 8 displayed by the administrator console 3. The policy setting screen 8 is used for setting the policy to be applied to a client terminal 1. The policy setting screen 8 is realized as, for example, a web-based user interface. The administrator of the management server 2 can determine the policy to be applied to the client terminal 1 by the operation on the policy setting screen 8. The management server 2 stores policy information 21 indicating the determined policy and uses the policy information 21 to control the client terminal.

The policy setting screen 8 for setting the policy to be applied to a client terminal 1 includes items such as a policy name 81, an authentication server 82, an OS module 83, a VDI server 84, communication setting 85, and a download server 86. For example, each item displays the content in process of setting up. The administrator can arbitrarily change the content of each item.

The policy name 81 indicates the name given to the policy. The authentication server 82 indicates the address (URL) of the authentication server used to authenticate the client terminal 1. The address indicates, for example, the connection destination for using the authentication function of the management server 2.

The OS module 83 includes the name (file name) 830 of the OS module to be used and check boxes 831 and 832. For example, after the file of a new OS module that includes a newly added function or security update is released, the administrator can set (select) the name of the released OS module as the name 830 of the OS module to be used.

The check box 831 indicates whether saving the OS module in the client terminal 1 is permitted. When the check box 831 is checked, a nonvolatile memory (external storage) connected to the client terminal 1, such as a memory card can save the OS module. For example, if the client terminal 1 downloads the OS module via a network of poor quality at the time of startup (boot-up), the downloading requires a large amount of time. Thus, it takes long to complete the startup. When the check box 831 is checked, the external storage connected to the client terminal 1 caches the OS module. The client terminal 1 loads the OS module from the external storage at the next startup. Since the client terminal 1 skips downloading the OS module at the next start up, the client terminal 1 can boot up rapidly.

The check box 832 indicates whether downloading the OS module in the background is permitted when saving the OS module in the client terminal 1 is permitted. As shown in FIG. 2, the check box 832 may be operable by the administrator when the check box 831 is checked, in other words, when saving the OS module in the client terminal 1 is permitted. The check box 832 may not be operable by the administrator when the check box 831 is unchecked, in other words, when saving the OS module in the client terminal 1 is prohibited.

The VDI server 84 indicates the address of the VDI server 4. The communication setting 85 indicates the operation setting of the client terminal 1. The communication setting 85 includes, for example, the number of and interval of communication retries, the polling interval of startup authentication, and an action at the time of communication disconnection. The download server 86 indicates the address of the download server. The address of the download server indicates, for example, the connection destination for using the download function of the management server 2. The management server 2 functions as an authentication server for the access to the address indicated in the authentication server 82, and functions as a download server for the access to the address indicated in the download server 86.

The client terminal 1 does not have built-in storage (for example, a hard disk drive [HDD] or solid-state drive [SSD]), and for example, downloads the OS module (file) of an operating system including a program necessary for communication with the VDI server 4 from the management server 2 via a network at the time of startup. The client terminal 1 places (loads) the downloaded OS module on the volatile memory and executes the placed OS module to communicate with the VDI server 4.

This OS module may be stored (cached) in external storage connected to the client terminal 1, such as an SD card or USB flash memory. The client terminal 1 can reduce the time required to complete startup (for example, the time until the client terminal 1 can communicate with the VDI server 4) since the client terminal 1 places the stored OS module from the external storage on a volatile memory and executes the OS module at the time of startup.

The management server 2 sets the OS module to be used in each client terminal 1 and changes it in accordance with the addition of a new function, security update, etc. For example, when the management server 2 changes the OS module to be used in a client terminal 1, the client terminal 1 downloads a new OS module from the management server 2 and stores it in external storage at the time of booting the client terminal 1. The client terminal 1 then places the downloaded OS module on a volatile memory and executes it. Thus, the storage time in the external storage may increase the startup time of the client terminal 1 in comparison with a case where the client terminal 1 simply downloads a new OS module from the management server 2.

In the present embodiment, a client terminal 1 is booted using an OS module already stored in external storage in a case where the client terminal 1 finds that the management server 2 changes the OS module to be used in the client terminal 1, at the time of startup. After the startup, the client terminal 1 downloads the changed OS module from the management server 2 in the background and newly stores the OS module in external storage. In this way, even when the management server 2 changes the OS module to be used in the client terminal 1, the startup time can be reduced by using the OS module already stored in external storage. In addition, the client terminal 1 can use the OS module newly stored in external storage at the next startup or afterward without downloading the changed OS module from the management server 2 at the time of startup. In this manner, the client terminal 1 can reduce the startup time.

With reference to FIG. 3, this specification explains the functional configuration of the client terminal 1 of the present embodiment. Here, this specification shows an example in which a removably connectable nonvolatile memory, such as a memory card 19A, is connected to the client terminal 1.

The management server 2 includes a storage device that stores the policy information 21, an OS module 22, etc. The OS module 22 includes VDI connection software. The VDI connection software is a client program (VDI client program) configured to communicate with the VDI server 4 providing virtual desktop environment and receive a virtual desktop image from the server.

When the VDI server 4 is realized as a virtual machine type, multiple virtual machines 41 are executed on the VDI server 4. The VDI server 4 allocates one of the virtual machines 41 to the client terminal 1. Each virtual machine 41 includes a virtual OS (client desktop OS) 43 and an application program 42 executed on the virtual OS 43. It should be noted that the VDI server 4 is not limited to a virtual machine type. The VDI server 4 may be realized as a blade computer type, a terminal type, etc.

When a power button is pressed, the client terminal 1 executes a basic input/output system (BIOS) 141 stored in a BIOS-ROM 14 to start an embedded OS 142. The embedded OS 142 is, for example, Small Linux, and includes instructions minimum required such as instructions for network connection and downloading the application OS module from the management server 2. The management server 2 sets the application OS module to cause the client terminal 1 to use it. When the client terminal 1 executes the embedded OS 142, the client terminal 1 is connected to a wired or wireless network. The BIOS may be a UEFI BIOS. A flash EEPROM may constitute the BIOS-ROM 14 to enable update.

The embedded OS 142 connects the client terminal 1 to the management server 2 via a network. When the management server 2 sets a first OS as the OS to be used in the client terminal 1 by switching from the embedded OS 142, and the memory card 19A is connected via an interface such as a card slot and stores not the first OS but a second OS that is used at the previous startup of the client terminal 1, the embedded OS 142, when executed, causes various components provided in the client terminal 1, such as a processor (CPU), to execute functions of loading the second OS into a RAM (main memory) 13 and starting the second OS. More specifically, the instructions included in the embedded OS 142 controls, when executed, various components provided in the client terminal 1, such as the processor (CPU), so as to function (operate) as a connection control module 51, a module determination module 52, a first download control module 53, and a startup control module 54.

The connection control module 51 connects the client terminal 1 with the management server 2 via a wired or wireless network. The connection control module 51 performs a process for authenticating the client terminal 1 with the management server 2.

When the management server 2 authenticates the client terminal 1 at the time of startup of the client terminal 1, the module determination module 52 receives first information and second information from the management server 2. The first information specifies the application OS module to be used in the client terminal 1 (for example, a file name of the application OS module). The second information indicates whether saving the application OS module in the client terminal 1 is permitted. The first and second information are included in the policy information 21 of the management server 2. When saving the application OS module in the client terminal 1 is permitted, the second information may further include information indicating whether downloading the application OS module in the background is permitted.

The module determination module 52 uses the first information and the previously used module information 143 stored in the BIOS-ROM 14 to determine whether the application OS module that is set by the management server 2 and should be used in the client terminal 1 is changed from the OS module stored (cached) in the memory card 19A. The module determination module 52 uses the previously used module information 143 (for example, a file name of the previously used OS module) to specify the previously used OS module.

The module determination module 52 determines that the application OS module to be used in the client terminal 1 is not changed from the previously used OS module when the first information and the previously used module information 143 indicate the same OS module. The module determination module 52 determines that the application OS module to be used in the client terminal 1 is changed from the previously used OS module when the first information indicates an OS module different from that of the previously used module information 143. When the application OS module is changed from the previously used OS module, the module determination module 52 updates (overwrites) the previously used module information 143 with the first information specifying the application OS module.

Subsequently, the module determination module 52 uses the second information to determine whether saving the application OS module to be used in the client terminal 1 in the client terminal 1 is permitted, in other words, whether storing the application OS module in external storage (for example, the memory card 19A) is permitted.

When saving the application OS module in the client terminal 1 is prohibited, the client terminal 1 can obtain the application OS module only by the download from the management server 2. Thus, the first download control module 53 downloads the application OS module from the management server 2 and places it as a non-embedded OS 131 on the RAM 13. The startup control module 54 starts the non-embedded OS 131 placed on the RAM 13. The startup control module 54 switches the control such that the driver and library included in the non-embedded OS 131 are executed while succeeding to the setting of the embedded OS 142.

When saving the application OS module in the client terminal 1 is permitted, the module determination module 52, the first download control module 53 and the startup control module 54 perform the following operation.

When the memory card 19A stores the application OS module, the module determination module 52 places an OS module 191 as the non-embedded OS 131 on the RAM 13 from the memory card 19A.

When the memory card 19A does not store the application OS module, the module determination module 52 operates based on whether downloading the application OS module in the background is permitted, using the second information.

In other words, when the memory card 19A does not store the application OS module, and saving the application OS module in the client terminal 1 is permitted and downloading it in the background is prohibited, the first download control module 53 downloads the application OS module from the management server 2 and places it as the non-embedded OS 131 on the RAM 13. The first download control module 53 then stores the downloaded application OS module in the memory card 19A. In this way, when downloading an application OS module in the background is prohibited, the application OS module is always downloaded and stored in the memory card 19A at the time of startup. Thus, when the administrator does not want the user to use the OS module used at the previous startup of the client terminal 1 in consideration of the security and function update, the use of the OS module can be prevented.

When the memory card 19A does not store the application OS module and stores the OS module 191 used at the previous startup of the client terminal 1, and saving the application OS module in the client terminal 1 and downloading it in the background are permitted, the module determination module 52 places the OS module 191 as the non-embedded OS 131 on the RAM 13 from the memory card 19A.

When the memory card 19A stores neither the application OS module nor the OS module used at the previous startup of the client terminal 1, and saving the application OS module in the client terminal 1 and downloading it in the background are permitted, the first download control module 53 downloads the application OS module from the management server 2 and places it as the non-embedded OS 131 on the RAM 13. The first download control module 53 then stores the downloaded application OS module in the memory card 19A.

When, on the policy setting screen 8 shown in FIG. 2, the administrator prohibits saving the application OS module in the client terminal 1, or the administrator permits saving the application OS module in the client terminal 1 and prohibits downloading the application OS module in the background, using the OS module used at the previous startup of the client terminal 1 to start the non-embedded OS 131 can be prohibited. When, on the policy setting screen 8 shown in FIG. 2, the administrator permits saving the application OS module in the client terminal 1 and downloading the application OS module in the background, using the OS module used at the previous startup of the client terminal 1 to start the non-embedded OS 131 can be permitted.

In this way, the startup control module 54 starts the non-embedded OS 131 placed on the RAM 13. The startup control module 54 switches the control such that the driver and library included in the non-embedded OS 131 are executed while succeeding to the setting of the embedded OS 142.

The instructions included in the non-embedded OS 131 controls, when executed, various components provided in the client terminal 1, such as the processor (CPU), so as to function (operate) as a VDI client processing module 61, a second download control module 62 and a notification processing module 63.

The VDI client processing module 61 connects the client terminal 1 with a virtual machine 41 on the VDI server 4 via a network. The VDI client processing module 61 receives the image data of the screen (VDI screen data) for virtual desktop environment and image data corresponding to the update portion of the screen from the VDI server 4. The VDI client processing module 61 displays a screen based on the image data. The VDI client processing module 61 can transmit the operation information of an input device by the user to the VDI server 4 via a network. The operation information of an input device includes, for example, the operation information of a keyboard (software keyboard), the operation information of a mouse, and touch operation information for a touchpad, a touchscreen display, etc.

When the non-embedded OS 131 starts by using the OS module 191 used at the previous startup of the client terminal 1 (for example, the OS module stored in the memory card 19A), the second download control module 62 downloads the application OS module from the management server 2. The second download control module 62 then stores (caches) the downloaded application OS module in the memory card 19A. In a case where the non-embedded OS 131 starts by using the OS module 191 used at the previous startup of the client terminal 1, saving the application OS module in the client terminal 1 (here, the memory card 19A) is permitted. Thus, when the management server 2 permits storing (saving) the application OS module in the memory card 19A, the second download control module 62 downloads the application OS module from the management server 2 and stores the downloaded application OS module in the memory card 19A. When the management server 2 prohibits storing the application OS module in the memory card 19A, the second download control module 62 does not download the application OS module from the management server 2. Since the second download control module 62 is configured to operate parallel to the VDI client processing module 61 providing virtual desktop environment, the second download control module 62 can download the application OS module in the background.

When downloading the application OS module and storing it in the memory card 19A are completed, the notification processing module 63 may notify the user that a new application OS module is cached and prompt the user to reboot the client terminal 1. For example, the notification processing module 63 displays a message indicating that a new application OS module is cached on the screen.

When the user performs operation for shutting down the client terminal 1 while the second download control module 62 downloads and stores (caches) the application OS module, the notification processing module 63 may notify the user that the download and storage of the application OS module are in progress. Then, the notification processing module 63 may make the user select either immediate shutdown of the client terminal 1 or shutdown of the client terminal 1 after the completion of the download and storage. For example, the notification processing module 63 displays, on the screen, a dialogue including a message indicating that the download and storage of the application OS module are in progress, a button for selecting immediate shutdown, and a button for selecting shutdown after the completion of download and storage. When the user selects immediate shutdown, the second download control module 62 may resume downloading and storing the application OS module in the background at the next time the client terminal 1 is booted.

The instructions included in the non-embedded OS 131 may control, when executed, various components provided in the client terminal 1, such as the processor (CPU), so as to further function (operate) as a module determination module 64.

The module determination module 52 of the embedded OS 142 described above determines, at the time of startup, whether the management server 2 changes the OS to be used in the client terminal 1 by switching from the embedded OS 142 from the previously used OS module to a different OS module. In this way, the module determination module 52 is configured to detect the change in the application OS module only at the time of booting the client terminal 1.

The module determination module 64 of the non-embedded OS 131 regularly confirms the change in the application OS module by the management server 2 after the startup of the non-embedded OS 131. Thus, for example, the module determination module 64 can detect the change in the application OS module by the management server 2 while the VDI client processing module 61 communicates with the VDI server 4 to provide virtual desktop environment to the client terminal 1.

When the module determination module 64 detects the change in the application OS module and the memory card 19A does not store (cache) the application OS module, the second download control module 62 downloads a new application OS module from the management server 2 in the background and stores the downloaded application OS module in the memory card 19A. Thus, there is a high possibility that the latest application OS module is stored in the memory card 19A at the next time the client terminal 1 is booted. In this way, it is possible to increase the probability that the client terminal 1 uses the intended OS module for the administrator.

Further, the module determination module 64 may detect a further change in the application OS module by the management server 2 while the second download control module 62 downloads the application OS module from the management server 2. In this case, the second download control module 62 stops downloading the application OS module and starts downloading the new application OS module set by the management server 2 and storing it in the memory card 19A. In this way, it is possible to prevent the decrease in free space caused by caching useless data such as an unnecessary OS module in the memory card 19A.

With reference to the flowchart of FIG. 4, this specification explains an example of the procedure of a startup control process executed by a client terminal 1. Here, this specification shows an example in which the client terminal 1 does not include the second download control module 62 configured to download the OS module 22 in the background.

When the client terminal 1 is booted, the embedded OS 142 is started (step S101). The OS module (application OS module) that should be applied to the client terminal 1 and is set in the management server 2 is confirmed by communication with the management server 2 (step S102).

Subsequently, whether the cache of the application OS module in external storage (here, the memory card 19A) is permitted is determined (step S103). When the cache in external storage is not permitted (No in step S103), the application OS module is downloaded from the management server 2 to the client terminal 1 (step S104).

When the cache in external storage is permitted (Yes in step S103), whether the application OS module is already cached in external storage is determined (step S105). When the application OS module is already cached in external storage (Yes in step S105), the cached application OS module is loaded from the external storage (step S106).

When the application OS module is not cached (No in step S105), the application OS module is downloaded from the management server 2 (step S107) and is cached in external storage (step S108).

Subsequently, the application OS module loaded from the external storage in step S106 is, or the application OS module downloaded from the management server 2 in step S104 or step S107 is decoded and is placed as the non-embedded OS 131 on the main memory 13 (step S109). The control is switched from the embedded OS 142 to the non-embedded OS 131 by dynamically switching the OS (step S110), and the startup is completed.

In the above startup control process, the control can be switched from the embedded OS 142 to the non-embedded OS 131, using the application OS module cached in the memory card 19A or the application OS module downloaded from the management server 2. In this startup control process, when the application OS module is downloaded from the management server 2, a process for the cache in the memory card 19A is performed in addition to download. Thus, the startup time is equal to or longer than that of normal startup which does not use the memory card 19A (external storage).

Thus, the client terminal 1 of the present embodiment is configured to provisionally start the non-embedded OS 131 with the OS module used at the previous startup and download a new application OS module in the background. The flowchart of FIG. 5 shows an example of the procedure of a startup control process executed by each client terminal 1. For example, this startup control process is realized when the CPU 11 of the client terminal 1 executes the instructions included in the embedded OS 142 and the instructions included in the non-embedded OS 131.

When the client terminal 1 is booted, the embedded OS 142 is started (step S201). The OS module (application OS module) that is set in the management server 2 and should be applied to the client terminal 1 is confirmed by communication with the management server 2 (step S202). By this confirmation, for example, information by which the application OS module can be specified (for example, a file name or ID) is obtained.

Subsequently, whether the confirmed application OS module is different from the previously used OS module is determined (step S203). The information 143 (for example, a file name or ID) related to the previously used OS module is stored in, for example, the BIOS-ROM 14. It is possible to determine whether the confirmed application OS module is different from the previously used OS module by using the information 143.

When the confirmed application OS module is different from the previously used OS module (Yes in step S203), the information (for example, a file name or ID) by which the application OS module can be specified is stored in, for example, the BIOS-ROM 14, as the information 143 related to the previously used OS module. When the confirmed application OS module is the same as the previously used OS module (No in step S203), the process of step S204 is skipped.

Subsequently, whether the cache of the application OS module in external storage (here, the memory card 19A) is permitted is determined (step S205). When the cache in external storage is not permitted (No in step S205), the application OS module is downloaded from the management server 2 to the client terminal 1 (step S206).

When the cache in external storage is permitted (Yes in step S205), whether the application OS module is already cached in external storage is determined (step S207). When the application OS module is already cached in external storage (Yes in step S207), the cached application OS module is loaded from the external storage (step S208).

When the application OS module is not cached (No in step S207), whether the previously used OS module is already cached in external storage is determined (step S209). When the previously used OS module is already cached in external storage (Yes in step S209), the cached previously used OS module is loaded from the external storage (step S210).

When the previously used OS module is not cached in external storage (No in step S209), the application OS module is downloaded from the management server 2 (step S211), and is cached in external storage (step S212). For example, the application OS module is stored in external storage after encryption with a key unique to the device (for example, the client terminal 1).

Subsequently, the application OS module obtained in step S206, step S208 or step S211 is, or the previously used OS module obtained in step S210 is, decoded, and is placed on the main memory 13 as the non-embedded OS 131 (step S213). By dynamically switching the OS, the control is switched from the embedded OS 142 to the non-embedded OS 131 (step S214). On the client terminal 1, for example, the control is switched by executing the driver and library included in the non-embedded OS 131 while succeeding to the setting of the embedded OS 142.

Whether starting the non-embedded OS 131 after switching uses the previously used OS module is determined (step S215). When starting the non-embedded OS 131 uses the previously used OS module (Yes in step S215), downloading the application OS module confirmed in step S202 is started in the background (step S216). When starting the non-embedded OS 131 does not use the previously used OS module (No in step S215), in other words, when starting the non-embedded OS 131 uses the application OS module confirmed in step S202, the process of step S216 is skipped.

In the above manner, when starting the non-embedded OS 131 uses the previously used OS module, downloading the application OS module is started in the background. Thus, it is possible to quickly activate the client terminal 1 by avoiding the increase in the time required to complete the startup of the client terminal 1 because of downloading the application OS module.

With reference to the flowchart of FIG. 6, this specification explains an example of the procedure of a download control process executed by each client terminal 1. For example, this download control process is executed after the completion of the startup of the client terminal 1 by the startup control process shown in FIG. 5.

The application OS module that is set in the management server 2 and should be applied to the client terminal 1 is confirmed by the communication with the management server 2 (step S31). Whether the application OS module is changed after the previous confirmation is determined based on the above confirmation (step S32). When the application OS module is not changed (No in step S32), the process returns to step S31.

When the application OS module is changed (Yes in step S32), whether the application OS module is already cached in external storage (here, the memory card 19A) is determined (step S33). When the application OS module is already cached in the external storage (Yes in step S33), the process returns to step S31.

When the application OS module is not cached in external storage (No in step S33), whether downloading an OS module different from the application OS module is in progress in the background is determined (step S34). When downloading an OS module different from the application OS module is in progress in the background (Yes in step S34), downloading the OS module is stopped (step S35). When downloading an OS module different from the application OS module is not in progress in the background (No in step S34), the process of step S35 is skipped. Subsequently, downloading a new application module, in other words, the application OS module currently set for the client terminal 1 in the management server 2, is started in the background (step S36). The process then returns to step S31.

As described above, when the management server 2 changes the setting of the OS module to be applied to the client terminal 1 after the startup of the client terminal 1, the client terminal 1 can download, in place of the OS module before change, the OS module after change in the background and can cache it in external storage (memory card 19A).

Figure 7:
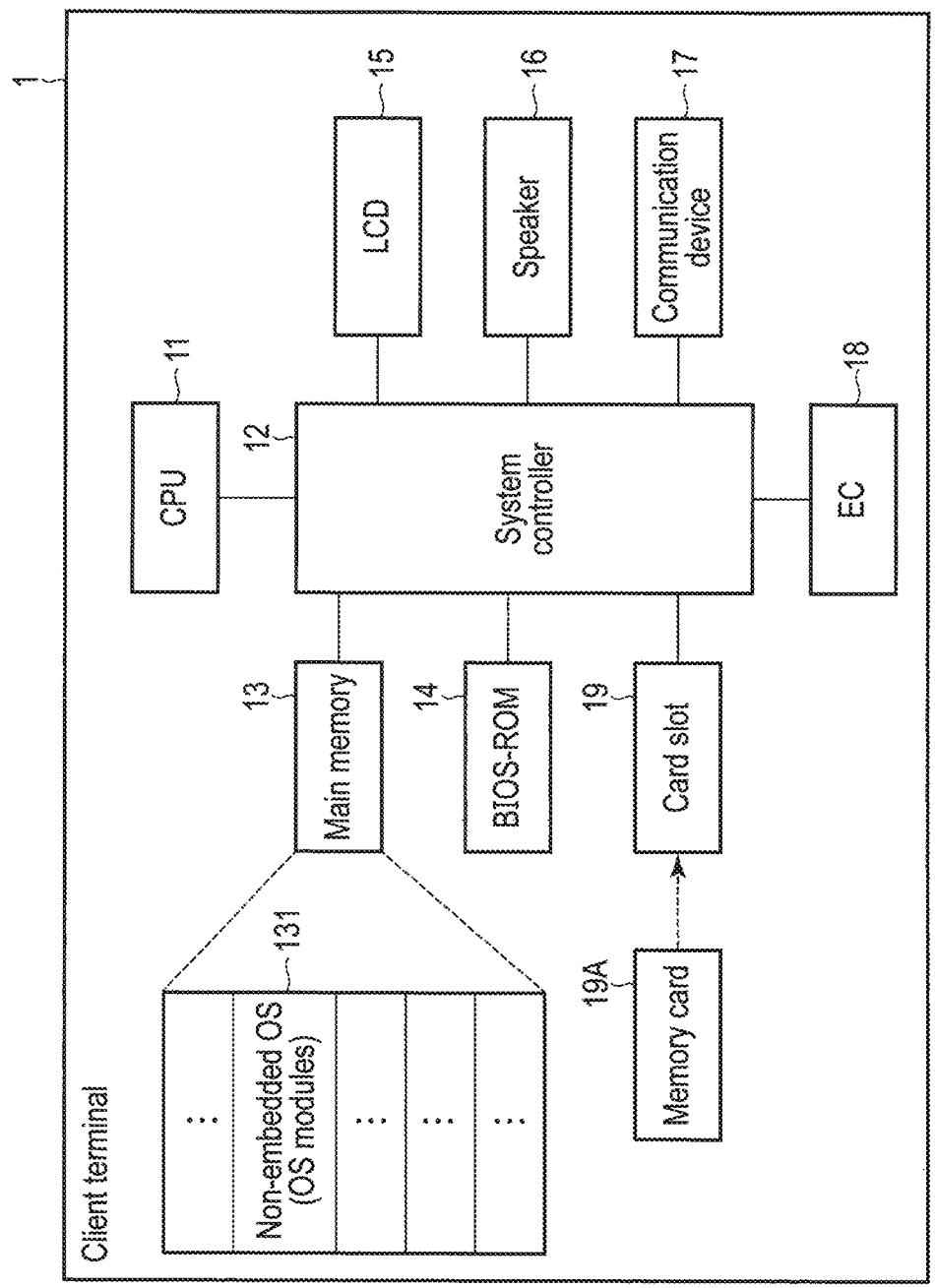
FIG. 7 is an exemplary block diagram showing a system configuration of the information processing apparatus of the embodiment.

FIG. 7 shows an example of the system configuration of each client terminal 1.

Each client terminal 1 includes, in addition to the above RAM (main memory) 13 and the BIOS-ROM 14, the CPU 11, a system controller 12, an LCD 15, a speaker 16, a communication device 17, an embedded controller (EC) 18, a card slot 19, etc. The card slot 19 is an interface removably connecting the memory card 19A.

The CPU 11 is a processor configured to execute the embedded OS 142 and the BIOS 141 stored in the BIOS-ROM 14, various programs (for example, the non-embedded OS 131) downloaded into the RAM (main memory) 13, and various programs loaded from the memory card 19A connected via the card slot 19 into the RAM (main memory) 13.

The system controller 12 is a bridge device connecting the CPU 11 and each component. The system controller 12 performs data writing and reading relative to the memory card 19A inserted into the card slot 19, such as an SD card.

The system controller 12 includes a display controller configured to control the LCD 15 used as the display monitor of the client terminal 1. The display controller generates a display signal and transmits it to the LCD 15. The LCD 15 displays a screen image based on the display signal. The system controller 12 also includes an audio controller configured to control the speaker 16. The audio controller generates an audio signal and transmits it to the speaker 16. The speaker 16 outputs sound based on the audio signal.

The communication device 17 is configured to perform wired communication or wireless communication. The communication device 17 includes a transmitter configured to transmit signals and a receiver configured to receive signals. The EC 18 functions as a power controller configured to manage the power for turning on or off the client terminal 1.

In addition to, or in place of, the card slot 19, an USB connector may be provided in the client terminal 1. In this case, the CPU 11 may execute a program loaded from, instead of the memory card 19A connected via the card slot 19, any nonvolatile memory connected via the USB connector, such as a flash memory, into the RAM (main memory) 13.

As explained above, in the present embodiment, the startup time can be reduced. The BIOS-ROM 14 stores the BIOS 141 and the embedded OS 142. The card slot 19 is configured to removably connect the memory card 19A. The embedded OS 142 causes the CPU 11 to execute connecting the client terminal 1 to the management server 2 via a network. When the management server 2 sets the first OS as the OS (non-embedded OS) to be used in the client terminal 1 by switching from the embedded OS 142, and the memory card 19A connected via the card slot 19A stores not the first OS (OS module) but the second OS (OS module) used at the previous startup of the client terminal 1, the embedded OS 142 causes the CPU 11 to execute loading the second OS stored in the memory card 19A into the RAM 13 and starting the second OS. The second OS causes the CPU 11 to execute downloading the first OS (OS module) from the management server 2 and storing the downloaded first OS in the memory card 19A.

When the first OS to be used in the client terminal 1 by switching from the embedded OS is not stored in the memory card 19A, the second OS already stored in the memory card 19A is started. While the second OS operates, the first OS is downloaded. Thus, this startup time of the client terminal 1 is reduced by starting the second OS. Further, the next startup time of the client terminal 1 can be reduced by starting the downloaded first OS.

Each of the functions described in the present embodiment may be realized by a circuit (processing circuit). For example, the processing circuit includes a programmed processor such as a central processing unit (CPU). The processor performs each of the described functions by executing a computer program (instructions) stored in a memory. The processor may be a microprocessor including an electric circuit. For example, the processing circuit includes a digital signal processor (DSP), an application specific integrated circuit (ASIC), a microcontroller, a controller, and other electric circuit components. A processing circuit may realize each of the components other than the CPU described in the present embodiment.

A computer program can realize each process of the present embodiment. Therefore, an effect similar to that of the present embodiment can be easily realized by merely installing the computer program on a computer through a computer-readable storage medium in which the computer program is stored and executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a processor;
a volatile memory;
a BIOS-ROM configured to store a basic input/output system (BIOS) and an embedded operating system; and
an interface to which a nonvolatile memory is removably connectable,
wherein the embedded operating system is configured to cause the processor to execute:
a process for connecting the information processing apparatus to a server via a network; and
when the server sets a first operating system as an operating system in the information processing apparatus by switching from the embedded operating system, and the nonvolatile memory connected via the interface stores a second operating system used at previous startup of the information processing apparatus, transitioning to a process for loading the second operating system into the volatile memory and starting the second operating system,
wherein the second operating system is configured to cause the processor to execute while the second operating system operates:
a process for downloading the first operating system from the server; and
wherein the second operating system is further configured to cause the processor to execute while the second operating system operates:
when the server changes the operating system to be used in the information processing apparatus to a third operating system during a process of downloading the first operating system from the server,
interrupting the process for downloading the first operating system from the server,
transitioning to a process for downloading the third operating system from the server, and
transitioning to a process for storing the downloaded third operating system in the nonvolatile memory.

2. The information processing apparatus of claim 1, wherein the embedded operating system is further configured to cause the processor to execute: when the server changes the operating system to be used in the information processing apparatus to a third operating system during a process of downloading the first operating system from the server, and the nonvolatile memory does not store the third operating system, a process for checking whether any other operating system different to the third operating system is being downloaded from the server.

3. The information processing apparatus of claim 1, wherein the embedded operating system is further configured to cause the processor to execute: when the server sets the second operating system as the operating system in the information processing apparatus by switching from the embedded operating system, and the nonvolatile memory stores the second operating system, a process for loading the second operating system stored in the nonvolatile memory into the volatile memory and starting the second operating system,
and wherein the second operating system is configured to cause the processor to execute while the second operating system operates:
when the server changes the operating system in the information processing apparatus from the embedded operating system by switching from the second operating system to the first operating system, a process for downloading the first operating system from the server and storing the downloaded first operating system in the nonvolatile memory.

4. The information processing apparatus of claim 1, wherein the second operating system is further configured to cause the processor to execute while the second operating system operates:
when the server permits storing the first operating system in the nonvolatile memory, a process for downloading the first operating system from the server and storing the downloaded first operating system in the nonvolatile memory; and
when the server prohibits storing the first operating system in the nonvolatile memory, not transitioning to downloading the first operating system from the server.

5. A computer-readable, non-transitory storage medium having stored thereon a program which is executable by a computer, the program controlling the computer to execute:
a process for connecting the computer to a server via a network; and
when the server sets a first operating system as an operating system to be used in the computer by switching from an embedded operating system stored in a BIOS-ROM, and a nonvolatile memory connected to the computer via an interface stores not the first operating system but a second operating system used at previous startup of the computer, a process for loading the second operating system into a volatile memory and a process for starting the second operating system comprising instructions for downloading the first operating system from the server while the second operating system operates, and the program further controlling the computer to execute under the second operating system;

when the server changes the operating system to be used in the information processing apparatus to a third operating system during a process of downloading the first operating system from the server, interrupting to download the first operating system from the server, transitioning to download the third operating system from the server, and transitioning to store the downloaded third operating system in the nonvolatile memory while the second operating system operates.

6. The computer-readable, non-transitory storage medium of claim 5, wherein the program controls the computer to further execute: when the server changes the operating system to be used in the information processing apparatus to a third operating system during a process of downloading the first operating system from the server, and the nonvolatile memory does not store the third operating system, a process for checking whether any other operating system different to the third operating system is being downloaded from the server.

* * * * *